(12) United States Patent
Raasch

(10) Patent No.: US 6,690,776 B1
(45) Date of Patent: Feb. 10, 2004

(54) COMMUNICATION ON HOLD NOTIFIER

(75) Inventor: Charles F. Raasch, Lake Forest, CA (US)

(73) Assignee: Conexant Systems, Inc., Newport Beach, CA (US)

(*) Notice: Subject to any disclaimer, the term of this patent is extended or adjusted under 35 U.S.C. 154(b) by 593 days.

(21) Appl. No.: 09/644,806

(22) Filed: Aug. 23, 2000

Related U.S. Application Data (63) Continuation-in-part of application No. 09/393,616, filed on Sep. 10, 1999, which is a continuation-in-part of application No. 09/394,018, filed on Sep. 10, 1999, which is a continuation-in-part of application No. 09/361,842, filed on Jul. 27, 1999.

(60) Provisional application No. 60/128,874, filed on Apr. 12, 1999.

(51) Int. Cl.[7] .............................................. H04M 11/00
(52) U.S. Cl. ................................. 379/93.35; 379/215.01
(58) Field of Search ...................... 379/67.1, 68, 90.01, 379/93.01, 93.09, 93.14, 93.25, 93.28, 93.34, 93.35, 187, 215.01, 93.05–93.06, 93.31; 375/222, 387.01, 393

(56) References Cited

U.S. PATENT DOCUMENTS

| | | | |
|---|---|---|---|
| 4,578,796 A | 3/1986 | Charalambous et al. . | 379/93.34 |
| 4,852,151 A | 7/1989 | Dittakavi et al. ........ | 379/93.35 |
| 5,127,051 A | 6/1992 | Chan et al. ................. | 375/222 |
| 5,287,401 A | 2/1994 | Lin ......................... | 379/93.35 |
| 5,317,594 A | 5/1994 | Goldstein ..................... | 375/222 |
| 5,367,563 A | 11/1994 | Sainton .................... | 379/93.29 |

(List continued on next page.)

FOREIGN PATENT DOCUMENTS

| | | |
|---|---|---|
| EP | 0 409 641 A2 | 1/1991 |
| EP | 0 409 641 B1 | 1/1991 |
| EP | 09409 641 A3 | 1/1991 |
| EP | 0 601 260 B1 | 6/1994 |
| EP | 0711060 A | 5/1996 |
| EP | 0 711 060 A1 | 5/1996 |
| EP | 0 812 096 A2 | 12/1997 |
| EP | 0 812 096 A3 | 12/1999 |
| FR | 2 771 577 | 5/1999 |
| WO | WO 96 05684 A | 2/1996 |
| WO | WO 9605684 A1 * | 2/1996 ............ H04M/3/22 |
| WO | WO 97/49228 | 12/1997 |
| WO | WO 99/27702 | 6/1999 |
| WO | WO 99/31813 | 6/1999 |

OTHER PUBLICATIONS

"V.90" Sep. 1998, ITU–T Telecommunication Standardization Sector of ITU, the whole document.

Multitech "V.92 Q&A", Internet, Online, Sep. 5, 2000, Retrieved from the Internet:<URL:http://www.multich.com/applications/data_fax/V92.ASP>.

*Primary Examiner*—George Eng
(74) *Attorney, Agent, or Firm*—Farjami & Farjami LLP (57) ABSTRACT

A communication system includes a controller, a data pump under the control of the controller and a data access arrangement under the control of the controller. The controller establishes a data communication session with a remote communication system using the data pump and the data access arrangement. The controller then places the communication session in an on-hold state for a period of time and generates an indication relating to a status of the on-hold state. The controller may generate a sound as an indication or may transmit data relating to the status. The sound may be generated by toggling a relay in the data access arrangement, by transmitting a tone or by transmitting an audio sample. The audio sample may be generated by a codec controlled by the controller. The indication is generated to provide a progress notification relating to the period of time, a warning notification relating to the period of time or an expiration notification of the period of time.

49 Claims, 7 Drawing Sheets

U.S. PATENT DOCUMENTS

| | | | |
|---|---|---|---|
| 5,513,251 A | | 4/1996 | Rochkind et al. ......... 379/93.25 |
| 5,519,767 A | * | 5/1996 | O'Haro et al. .............. 379/67.1 |
| 5,550,908 A | | 8/1996 | Cai et al. ................ 379/215.01 |
| 5,668,861 A | | 9/1997 | Watts .................... 379/215.01 |
| 5,684,825 A | | 11/1997 | Ko .............................. 375/222 |
| 5,729,594 A | | 3/1998 | Klingman ................ 379/93.12 |
| 5,757,890 A | | 5/1998 | Venkatakrishnan ...... 379/93.13 |
| 5,796,808 A | | 8/1998 | Scott et al. ............... 379/93.31 |
| 5,862,474 A | | 1/1999 | Kimball ....................... 375/222 |
| 5,896,444 A | | 4/1999 | Perlman et al. .......... 379/93.35 |
| 5,903,602 A | | 5/1999 | Torkkel ....................... 375/222 |
| 5,940,489 A | | 8/1999 | Cohn et al. ............ 379/215.01 |
| 6,122,346 A | * | 9/2000 | Grossman .................... 379/68 |
| 6,430,273 B1 | * | 8/2002 | Shaheen ................. 379/93.14 |

* cited by examiner

COMMUNICATION ON HOLD NOTIFIER

RELATED APPLICATIONS

The present application is a Continuation-In-Part of U.S. application Ser. No. 09/393,616, filed Sep. 10, 1999, which is a Continuation-In-Part application of U.S. application Ser. No. 09/394,018, filed Sep. 10, 1999, which is a Continuation-In-Part application of U.S. application Ser. No. 09/361,842, filed Jul. 27, 1999, which claims the benefit of U.S. provisional application Ser. No. 60/128,874, filed Apr. 12, 1999. All above-mentioned applications are hereby fully incorporated by reference in the present application.

BACKGROUND OF THE INVENTION

1. Field of the Invention

The present invention relates generally to communication systems. More particularly, the present invention relates to providing notifications during a communication session.

2. Background

The widespread use of the Internet as a daily research, entertainment, and communication tool has increased the deployment of modems and other communication devices. Many homes and offices use their existing telephone lines to access the Internet via modems. The existing lines, however, may support some subscriber-selected features, such as a call-waiting feature, which may interrupt a modem connection. Other similar interruptions may occur while using modems or other communication systems.

Recently, various communication on hold schemes have been suggested to remedy such interruptions. For example, when a call-waiting interrupts a communication session established between a local modem and remote modem, the local modem receiving the call-waiting interruption may request an on-hold period from the remote modem, so that the call waiting may be answered.

In some situations, however, such as when the remote modem is in communication with a server or an Internet service provider ("ISP"), the on-hold period may be dictated by the server or the ISP, as the case may be. For example, the ISP may not allow an on-hold period of greater than sixty (60) seconds. In such event, the remote modem advises the local modem that the communication session may not be placed on-hold for more than sixty (60) seconds. At this point, the first communication session is placed on hold and a second communication session is established when the call waiting is answered. However, if the on-hold state is not terminated prior to the expiration of the allotted on-hold time period, the remote modem terminates the first communication session.

One conventional approach to prevent the unwanted termination of the first communication session is for the local modem to abruptly cease the communication line, prior to the expiration of the on-hold period, and re-establish the first communication session. This conventional approach, however, has many drawbacks. For example, the user may not wish to terminate the second communication session at all. Also, even if the user wishes to terminate the second communication session, indeed the user would want to do so gracefully. In addition, the process of re-establishing the first communication session may produce tones that are irritating and annoying to the user's ear.

Accordingly, there is an intense need in the art to transfer the decision making process to the user and ensure that the user is notified and is kept apprised of the on-hold time period and its progress, so that the communication session may not be terminated unintentionally and may be re-established prior to the expiration of the on-hold period.

SUMMARY OF THE INVENTION

In accordance with the purpose of the present invention as broadly described herein, there is provided method and system for notifying a user of the status of a communication session.

In one aspect of the present invention, a communication system includes a controller, a data pump under the control of the controller and a data access arrangement controlled by the controller. The controller establishes a data communication session with a remote communication system, via a communication line, using the data pump and the data access arrangement. The controller then places the communication session in an on-hold state for a period of time and generates an indication relating to a status of the on-hold state.

In one aspect, the indication may be a sound. For example, the controller may generate the sound by toggling a relay in the data access arrangement, by transmitting a tone or by transmitting a digitized or synthesized audio sample. The controller may play the audio sample through a codec, which is in communication with the communication line through the data access arrangement. In some aspects, the sound is generated to provide a progress notification relating to the period of time, a warning notification relating to the period of time or an expiration notification of the period of time.

In another aspect, the indication may be data for display purposes or other use by the user. For example, in some aspects, a data packet, including the period of time may be transmitted to a display device for displaying a countdown of the remaining period.

These and other aspects of the present invention will become apparent with further reference to the drawings and specification, which follow.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing steps. It should be appreciated that such functional blocks may be realized by any number of hardware components and/or software components configured to perform the specified functions. For example, the present invention may employ various integrated circuit components, e.g., memory elements, digital signal processing elements, logic elements, look-up tables, tone generation elements, voice synthesizer elements, and the like, which may carry out a variety of functions under the control of one or more microprocessors or other control devices. In addition, those skilled in the art will appreciate that the present invention may be practiced in any number of data communication contexts and that the modem system described herein is merely one illustrative application for the invention. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. Indeed, for the sake of brevity, conventional encoding and decoding, caller ID detection or processing, tone detection or transmission, training, and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

It should be noted that the present invention may be practiced in conjunction with any, or a combination, of the embodiments of the inventions disclosed in the following related applications. Application Ser. No. 09/592,707, filed Jun. 13, 2000 and entitled "Communication On Hold", which claims the benefit of a provisional application serial No. 60/167,572, filed Nov. 26, 1999, and which "Communication On Hold" application is also a Continuation-In-Part of U.S. application Ser. No. 09/557,233, filed Apr. 24, 2000 and entitled "Quick Connect Parameter Exchange," which is a Continuation-In-Part of U.S. application Ser. No. 09/416, 482, filed Oct. 12, 1999 and entitled "Signaling Mechanism for Modem Connection Holding and Reconnecting," which applications are hereby fully incorporated by reference in the present application.

Figure 1:
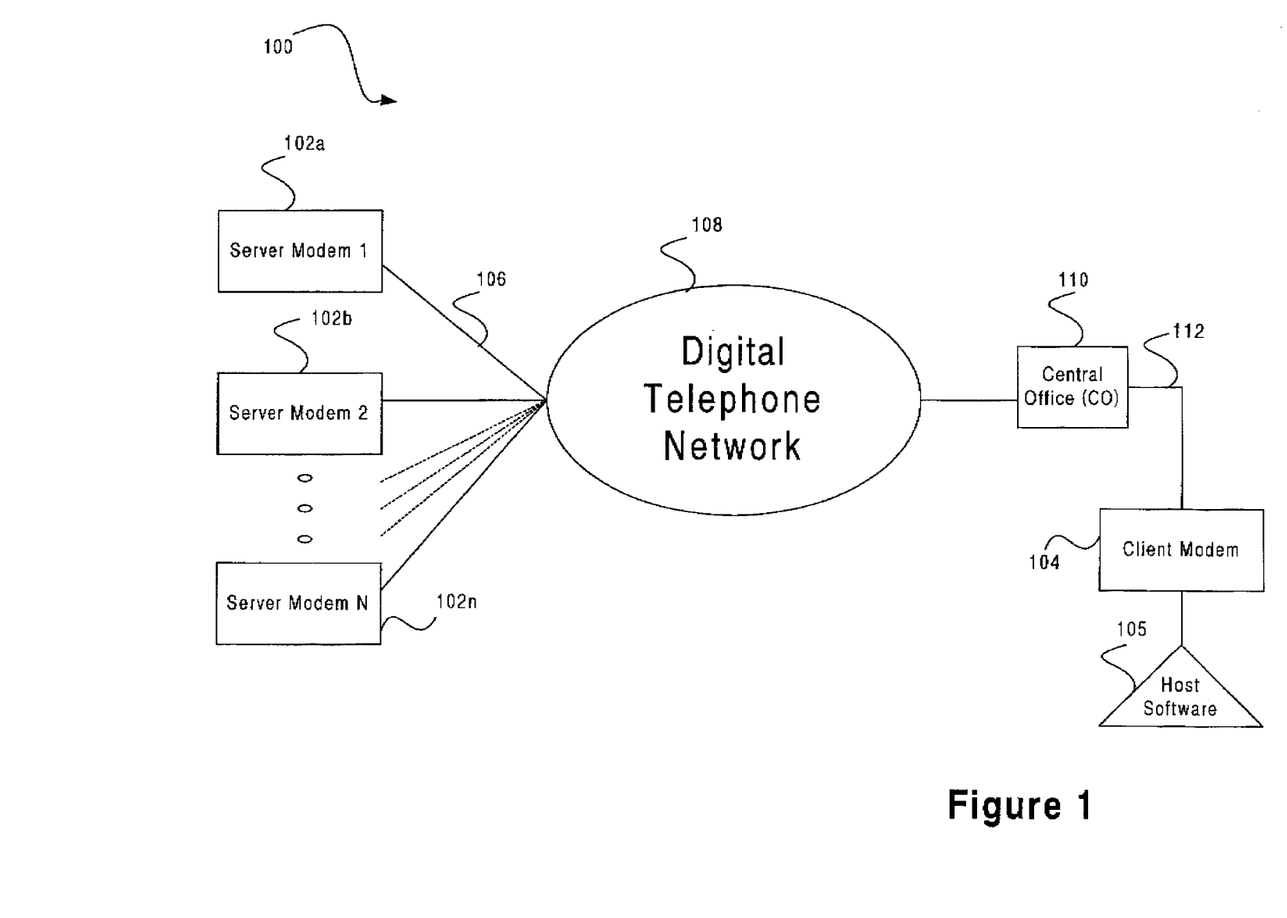
FIG. 1 is a block diagram depicting a general modem system environment capable of supporting point-to-point protocol ("PPP") connections.

Turning to the drawings, FIG. 1 illustrates a block diagram depicting a general modem system 100 in which the techniques of the present invention may be practiced. Modem system 100 may be capable of supporting connections associated with an upper layer protocol, e.g., point-to-point protocol ("PPP") connections. PPP connections are typically associated with Internet communications between, e.g., an individual end user and an Internet service provider. In this respect, modem system 100 includes a plurality of server modems (identified by reference numbers 102a, 102b, and 102n) and a client modem 104. Server modems 102 may each be associated with an Internet service provider or any suitable data source. Client modem 104 may be associated with a suitable data source, e.g., a personal computer capable of running host software 105. For purposes of this description, host software 105 may be any application and/or driver running on an operating system such as MICROSOFT WINDOWS, or any application program capable of functioning in conjunction with modem system 100. Although not shown in FIG. 1, client modem 104 may be integrated with the personal computer.

In the context of this description, modem system 100 may employ 56 kbps modem devices that are compatible with the V.92 Recommendation, the V.90 Recommendation, legacy 56 kbps protocols, the V.34 Recommendation, or the like. Such modem devices are suitable for use in the modem system 100 where a given server modem 102 utilizes a digital connection 106 to the digital telephone network 108. The client modem 104 is connected to a local central office 110 via an analog local loop 112. Thus, the communication channel established between client modem 104 and any server modem 102 is digital up to the central office 110. Thereafter, the digital signals are converted to an analog signal for transmission over the local loop 112.

If an end user desires to establish an Internet connection, host software 105 may perform any number of operations in response to a user command. For example, host software 105 may prompt client modem 104 to dial the telephone number associated with server modem 102a (which, for this example, is the server modem associated with the user's Internet service provider). Server modem 102a and client modem 104 perform a handshaking routine that initializes the equalizers, echo cancelers, transmit power levels, data rate, and possibly other operational parameters associated with the current communication channel.

Figure 2A:
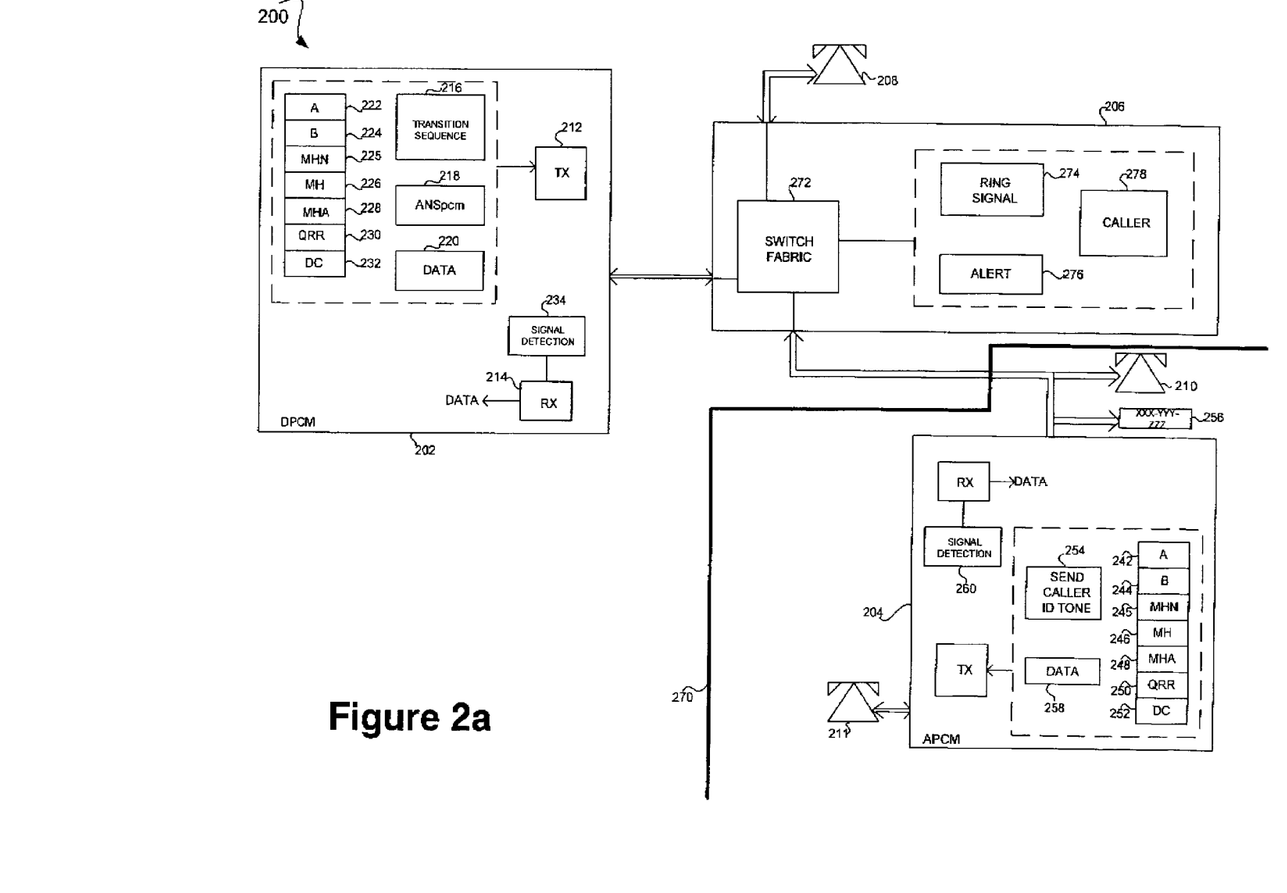
FIG. 2a is a block diagram of a modem system environment in which various aspects of the present invention may be incorporated.

FIG. 2a is a schematic representation of an exemplary environment in which a modem system 200 may operate. Modem system 200 generally includes a first modem device 202, which may be associated with a central site, and a second modem device 204, which may be resident at a customer site 270. In the context of a typical V.92 or V.90 system, first modem device 202 may be the DPCM and second modem device 204 may be the APCM. However, for purposes of the present invention, the first and second modems may be any communication device or any type of modem. In other words, the use of APCM and DPCM modems throughout the present application is merely exemplary.

As shown, the DPCM modem 202 is coupled to a central office 206 via a digital link and the APCM modem 204 is coupled to central office 206 via an analog link, e.g., the local loop. It should be appreciated that modem system 200 may include additional elements and functionality associated with the quick startup routine and/or the quick reconnect procedure described in the above-incorporated related applications.

FIG. 2a also depicts a calling device 208 (which is capable of placing an incoming call to the customer site), a parallel answer device 210 located at the customer site, and a series answer device 211 located at the customer site. As shown in FIG. 2a, the parallel answer device 210 is connected such that it receives the same calls as the APCM modem 204 in a concurrent manner. In contrast, the series answer device 211 is connected such that the APCM modem 204 routes calls to it. The APCM modem 204 may control or regulate the call traffic to and from series answer device 211 in a conventional manner. A call may be established between the calling device 208 and the answer devices 210 and 211 via the central office 206, and a modem connection may be established between the DPCM modem 202 and the APCM modem 204 via the central office 206.

For the sake of clarity and brevity, FIG. 2a depicts the APCM modem 204 and the DPCM modem 202 in a manner that relates to the example processes described herein. In practical embodiments, each of the modem devices 202 or 204 may be capable of functioning as a transmit or receive modem, and each of the modem devices 202 or 204 may be capable of originating the various signals described herein.

The DPCM modem 202 includes a transmitter section 212 and a receiver section 214, both of which may be configured in accordance with conventional technologies. The DPCM modem 202 is capable of transmitting a number of. signals, sequences and tones during various modes of operation. The DPCM modem 202 may be configured to transmit a suitable transition sequence 216 and a characteristic signal point sequence (such as the ANSpcm signal 218) associated with a quick startup routine or a quick reconnect procedure, as described in the above-incorporated related applications. During the data mode, the DPCM modem 202 transmits data 220 in accordance with a suitable data transmission scheme.

The DPCM modem 202 is also capable of transmitting a number of signals that may be received by the APCM modem 204 and/or by the central office 206. For example, the DPCM modem 202 is capable of transmitting an "A" tone 222 and a "B" tone 224 as described herein. In one embodiment, the "A" tone 222 is a 2400 Hz tone and the "B" tone 224 is a 1200 Hz tone (as set forth in ITU-T Recommendation V.34). Of course, the modem devices 202 or 204 may generate and process any suitable tones or signals in lieu of (or in addition to) these predefined tones. The DPCM modem 202 is also configured to transmit a number of additional signals associated with the notification of a modem-on-hold, the initiating of a modem-on-hold mode, the reconnection of a modem session after a holding period, and the clearing down of a modem connection, as further described below. For example, the DPCM modem 202 may be capable of transmitting a modem hold notification 225, a modem hold request 226, a modem hold acknowledgment 228, a quick reconnect request 230 and a disconnect signal 232 (referred to herein as "modem status signals"). The format and function of these signals are described in more detail below. The DPCM modem 202 may also include a signal detection element 234, which may employ any number of known techniques to detect, analyze, and interpret control signals, requests, and tones transmitted by the APCM modem 204 and/or by the central office 206. For example, signal detection element 234 may utilize a conventional tone detector and/or a conventional V.34, V.90 or V.92 differential phase-shift keying (DPSK) receiver configured to detect and distinguish the different signals described herein.

For purposes of the signaling scheme described herein, the APCM modem 204 is preferably configured in a manner similar to the DPCM modem 202. In other words, the APCM modem 204 is capable of transmitting an "A" tone 242, a "B" tone 244, a modem hold notification 245, a modem hold request 246, a modem hold acknowledgment 248, a quick reconnect request 250 and a disconnect signal 252. In addition, the APCM modem 204 may be configured to generate a send caller ID tone 254 that informs central office 206 that the customer site supports receiving the caller ID feature (as depicted by the caller ID component 256). In accordance with current standards, the send caller ID tone 254 is a DTMF "D" tone having a length of approximately 55–65 milliseconds. Of course, the APCM modem 204 transmits data 258 during the data mode.

As described above in connection with the DPCM modem 202, the APCM modem 204 preferably includes a signaling detection element 260 that enables APCM 204 to receive, detect, and analyze the various signaling tones and sequences transmitted by the DPCM modem 202. In this manner, both the APCM modem 204 and the DPCM modem 202 are capable of receiving the signals and are capable of switching operating modes in response to the particular signal or signals that are received.

The central office 206 is configured in a conventional manner to perform circuit switching associated with modem, voice, and facsimile calls. The central office 206 may support any number of customer sites and the central office 206 may be operatively coupled to any number of other central offices, central site modems, or the like. As described briefly above, the APCM modem 204, answer device 210, and caller ID component 256 may reside at customer site 270.

The central office 206 includes a suitable switching fabric 272 for routing calls between the appropriate parties. For example, the switching fabric 272 may switch to a first state to establish a modem connection between the DPCM modem 202 and the APCM modem 204 and to a second state to establish a voice connection between calling device 208 and answer device 210. Furthermore, switch fabric 272 may be capable of temporarily interrupting a connection to impress control signals, data, or tones onto the current circuit or line. In this respect, central office 206 may transmit a number of ring signals 274, alert signals 276, caller ID data 278, and other information depending upon the particular situation. For example, in accordance with current methodologies, central office 206 may temporarily interrupt a voice call and transmit a call-waiting alert signal 276 to the customer site 270. If the customer accepts the incoming call, then switch fabric 272 may be reconfigured to route the incoming call the customer site 270 while the original call is placed on hold.

As mentioned previously, the signaling scheme preferably employs Phase 2 signaling tones that are also used by conventional V.34, V.90 or V.92 modem systems. In addition, the signaling scheme uses DPSK transmission techniques, which allows the signaling to integrate in a seamless manner with V.34, V.90 and V.92 retraining procedures. The signals are configured such that they can be detected by either a V.34NV.90NV.92 DPSK receiver or by a relatively simple tone detector. In one practical embodiment, modem hold notifications, modem hold requests, modem hold acknowledgments, quick reconnect requests, and disconnect signals are preceded by a period (e.g., at least 50 milliseconds) of either tone "A" or tone "B". This technique leverages the use of the A and B tones, which are employed by conventional V.34, V.90 and V.92 modem systems, and takes advantage of the modulation scheme that is already in use by the modem system. Thus, because DPCM 202 will typically be conditioned to receive DPSK signals, the signaling mechanism is easy to implement.

The modem status signals that follow the "A" or "B" tones may be transmitted as DPSK signals based on a repeated bit pattern. In one embodiment, a modem status signal is a DPSK signal associated with eight repetitions of a four-bit pattern, where different patterns correspond to different modem status signals. The use of a four-bit pattern is desirable to enable the use of a simple tone detector for signaling detection elements 234 and 260; shorter bit patterns result in a fewer number of frequency components associated with the DPSK signal. Consequently, the signal detection scheme need not employ a complex processing routine that analyzes a large number of frequencies for spectral content. Illustrative bit patterns for the different modem status signals are set forth in Table 1 below.

TABLE 1

Modem Status Signals

| Modem Status Signal | Signal Abbreviation | DPSK Pattern |
| --- | --- | --- |
| Disconnect Signal | DC | 0101 |
| Modem Hold Notification | MHN | 0010 |
| Modem Hold Request | MH | 0011 |
| Modem Hold Acknowledge | MHA | 0001 |
| Quick Reconnect Request | QRR | 0111 |

The particular bit patterns are preferably selected such that the resultant DPSK signal is distinguishable over DPSK signals that are "reserved" for use in the context of other data communication protocols. For example, a DPSK pattern of all zeros is equivalent to the "A" or "B" tones, and a DPSK pattern of all ones is 10 equivalent to the V.34 INFOMARK signal. In addition, the particular bit patterns may be suitably selected such that the resultant DPSK signal is easy to detect by a tone detector. For the example bit patterns set forth in Table 1, the modem status signals will have the frequency content listed in Tables 2 and 3 below, where the frequencies are in Hertz, an "X" indicates spectral content greater than a threshold level, and a dash "–" indicates spectral content that is lower than the threshold level. For the example DPSK bit patterns shown in Table 1, a lower spectral energy component is at least 8 dB down from a higher spectral energy component at the same frequency. Consequently, the different modem status signals can be distinguished notwithstanding the existence of some shared frequency components.

TABLE 2

Frequency Components for Modem Status Signals (APCM)

|      | 900 | 975 | 1050 | 1125 | 1200 | 1275 | 1350 | 1425 | 1500 |
| ---  | --- | --- | ---  | ---  | ---  | ---  | ---  | ---  | ---  |
| DC   |     |     | X    |      |      |      | X    |      |      |
| MHN  |     |     |      |      |      | X    |      | X    |      |
| MH   | X   |     | X    |      | X    |      | X    |      | X    |
| MHA  |     | —   |      | X    |      | X    |      | —    |      |
| QRR  |     | X   |      | —    |      | —    |      | X    |      |

TABLE 3

Frequency Components for Modem Status Signals (DPCM)

|      | 2100 | 2175 | 2250 | 2325 | 2400 | 2475 | 2550 | 2625 | 2700 |
| ---  | ---  | ---  | ---  | ---  | ---  | ---  | ---  | ---  | ---  |
| DC   |      |      | X    |      |      |      | X    |      |      |
| MHN  |      |      |      |      |      | X    |      | X    |      |
| MH   | X    |      | X    |      | X    |      | X    |      | X    |
| MHA  |      | —    |      | X    |      | X    |      | —    |      |
| QRR  |      | X    |      | —    |      | —    |      | X    |      |

The different frequency ranges employed by the APCM and DPCM are related to an exemplary application where different carriers are used by the two modem devices. For example, in a conventional V.90 or V.92 system, the DPCM uses signaling near 2400 Hz (tone "B" and the DPSK carrier), while the APCM uses signaling near 1200 Hz. This feature was derived from the conventional V.34 scheme where the calling modem uses signaling near 1200 Hz and the answer modem uses signaling near 2400 Hz. Consequently, the two spectral patterns are the same but for the shift between 1200 Hz and 2400 Hz. This methodology ensures that the end devices can properly detect the signals even where both ends are transmitting the same type of signal.

In one embodiment, the modem status signal detection need not detect the entire "spectral fingerprint" for the given signals. Rather, signal detection elements 234 and 260 may be configured to detect and analyze a distinctive number of the spectral components for purposes of indicating a match. For example, as shown in Tables 2 and 3, if a signal contains relatively high spectral energy at 1050 Hz and 1350 Hz, then the signal may be a disconnect signal or a modem hold request. Accordingly, the signal detection routine will continue to analyze the signal for spectral content at 900 Hz, 1200 Hz, and/or 1500 Hz and make the appropriate decision.

Figure 2B:
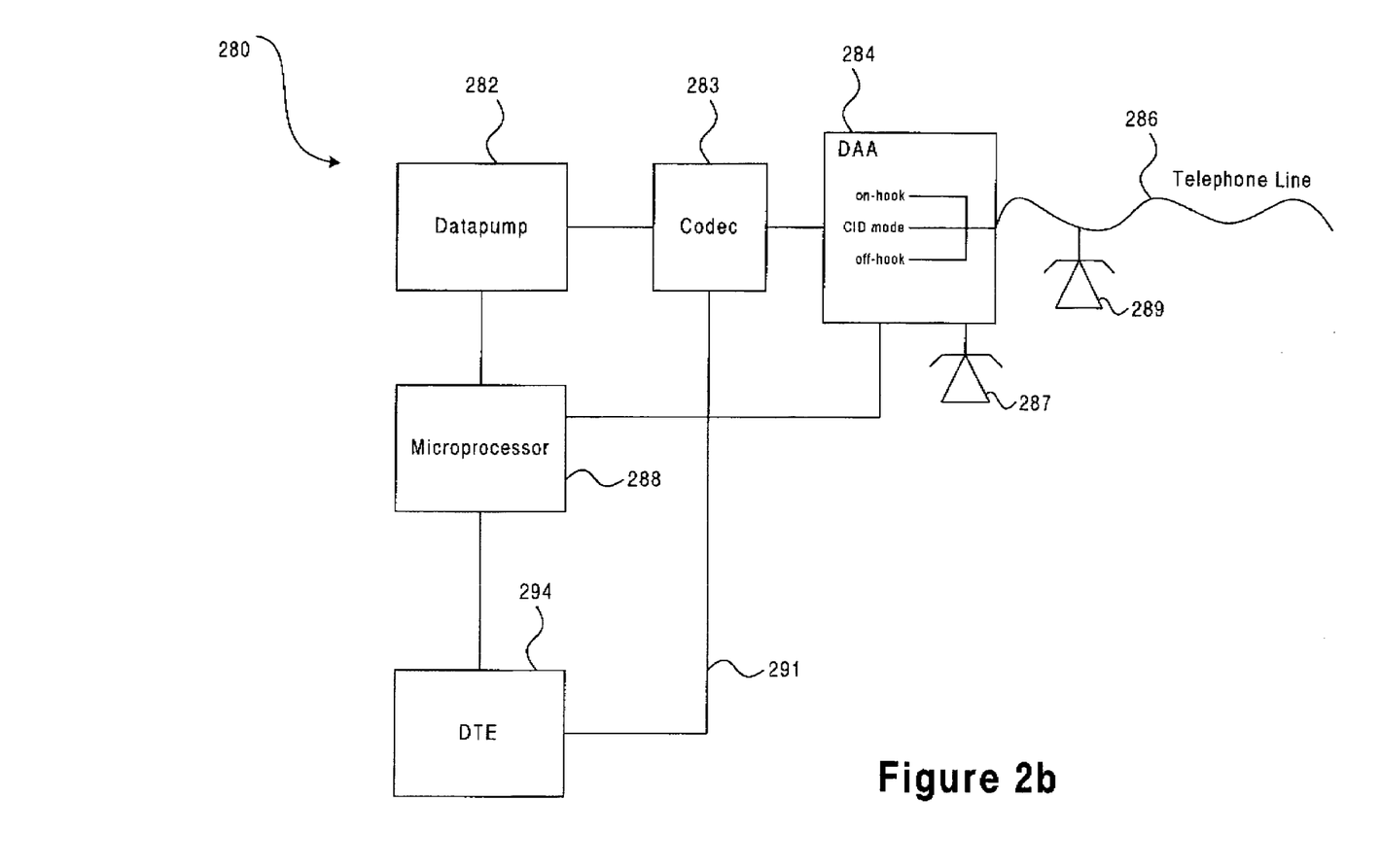
FIG. 2b is a block diagram of a modem in which various aspects of the present invention may be incorporated.

FIG. 2b illustrates a block diagram of a modem 280, such as the DPCM modem 202 or the APCM modem 204. As shown, the modem 280 includes a controller or a microprocessor 288 in communication with a data pump 282, a data access arrangement ("DAA") 284, a coder-decoder ("codec") 283. The microprocessor 288 may be any conventional microprocessor, comprising an arithmetic logic unit ("ALU"), memory, a clock and a power source. The microprocessor 288 may be any typical processor manufactured by Conexant, Intel, Zilog or Motorola. In some embodiments, the microprocessor 288 may be a host microprocessor, such as an Intel Pentium processor in an IBM-compatible personal computer. Further, in some embodiments, the data pump 282 may be implemented in a host microprocessor, such as an Intel Pentium processor in an IBM-compatible personal computer. In other words, the modem 280 may be a soft modem in which a host software performs modem and/or digital signal processing functions using a microprocessor in the host computer rather than in modem hardware. For example, the PowerPC and Intel's MMX Pentiums have instructions that allow them to perform signal-processing functions.

The purpose of the microprocessor 288 is to control various elements of the modem 280 and to communicate with various peripheral elements, such as a data terminal equipment 294 ("DTE"). For example, the microprocessor 288 may, through its input/output ("I/O") ports (not shown), cause the DAA 284 to take the modem 280 off-hook, i.e. establish a low-impedance path to a telephone line 286. In one embodiment, the off-hook path in the DAA 284 may be arranged by toggling an off-hook/on-hook relay establishing a low-impedance path via an audio coupling transformer connected in series to a resistor, a capacitor and an inductor. Yet, a high-impedance path—which is a conventional path used while the modem 280 monitors the line 286 for a caller ID—may be selected by the microprocessor 288 via toggling the off-hook/on-hook relay of the DAA 284. As a result, a high-impedance path may be established by the microprocessor 288 via an audio coupling transformer connected in series with a capacitor and an inductor.

As shown in FIG. 2b, the DAA 284 is in communication with a modem communication device 287, such as a telephone handset. In one embodiment, the microprocessor 288 may be able to detect whether the handset is off-hook or on-hook, for example, by detecting the telephone line 286 local handset loop-current through the DAA 284. In one embodiment, the microprocessor 288 may also be able to detect an extension off-hook condition for a line communication device 289, which is in communication with the telephone line 286. To this end, the microprocessor 288 may, for example, detect the voltage on the telephone line 286 or detect changes in DAA 284 current as a result of switching between on-hook and off-hook states by the line communication device 289. Also, the microprocessor 288 may be able to mute the modem communication device 287 through the DAA 284. Further, the microprocessor 288 may be able to generate audible sounds, such as tones or speech to be heard on the communication devices 287 and 289. An audible sound may be a clicking sound generated by toggling the off-hook/on-hook relay. Also, audible tones may be generated by the data pump 282, under the control of the microprocessor 288, at various frequencies, such as 1100 Hz or 2100 Hz. Further, an audible speech may be generated using the codec 283, under the control of the microprocessor 288.

The microprocessor 288 further controls and communicates with the data pump 282. For example, the microprocessor 282, through an interface, such as a set of registers in the data pump 282, may request that the data pump 282 initiate a data training process, such as a quick connect, or to detect or generate various tones, including single or dual tones. In one embodiment, the microprocessor 288 may program the data pump to transmit a tone at a specified frequency for a specified period, such as transmitting a tone at 1100 Hz or 2100 Hz for 10 ms. Furthermore, the microprocessor 288 may utilize the data pump 282 to generate and/or detect various signals, such as MH or MHN, for the purpose of implementing the communication on hold scheme, as described in the above-incorporated patent applications. In one embodiment, the microprocessor 288 may cause the data pump to generate a synthesized voice or other audio signal which may then be converted to an analog signal by the codec 283 and transmitted on the communication line 286 through the high or low impedance paths in the DAA 284.

The microprocessor 288 is further in communication with the DTE 294. Through the DTE 294 interface, the microprocessor 288 is able to receive/transmit data and/or commands from/to various software applications, such as applications running in a Microsoft Windows environment. For example, the microprocessor 288 may be able to transmit a time-out value, e.g., communication-on-hold time-out, to a Windows application, which in response is capable of popping up a window for displaying the communication-on-hold countdown period.

As shown in FIG. 2b, the microprocessor 288 is also in communication with a codec 283 through the data pump 282. The codec 283 may be a component that converts analog sound, speech or video to digital and vice versa (digital to analog). In one embodiment, the codec 283 may be replaced with a digital to analog converter ("DAC"). The DAC may be a microprocessor or a circuit that can convert digital data into analog information represented in continuous form, such as a signal that a speaker may render into sound. The microprocessor 288 may utilize the codec 283 to transmit a sound or a digitized (or synthesized) audio sample through the DAA 284, such that the sound or the digitized (or synthesized) audio sample, such as a voice or a tone, is audible on the modem communication device 287 or the line communication device out, 289. In one embodiment, the codec 283 may receive digital samples directly via a line 291 from the DTE 294, which may be in communication with a host system (not shown). Using the digital samples from the DTE 294, the codec 283 generates a sound or a digitized (or synthesized) audio sample for transmission to the communication line 286 via the high or low impedance paths in the DAA 284, as described above. In another embodiment, the DTE 294 may transmit the digital audio samples indirectly via the microprocessor 288, to the codec 283.

Figure 3:
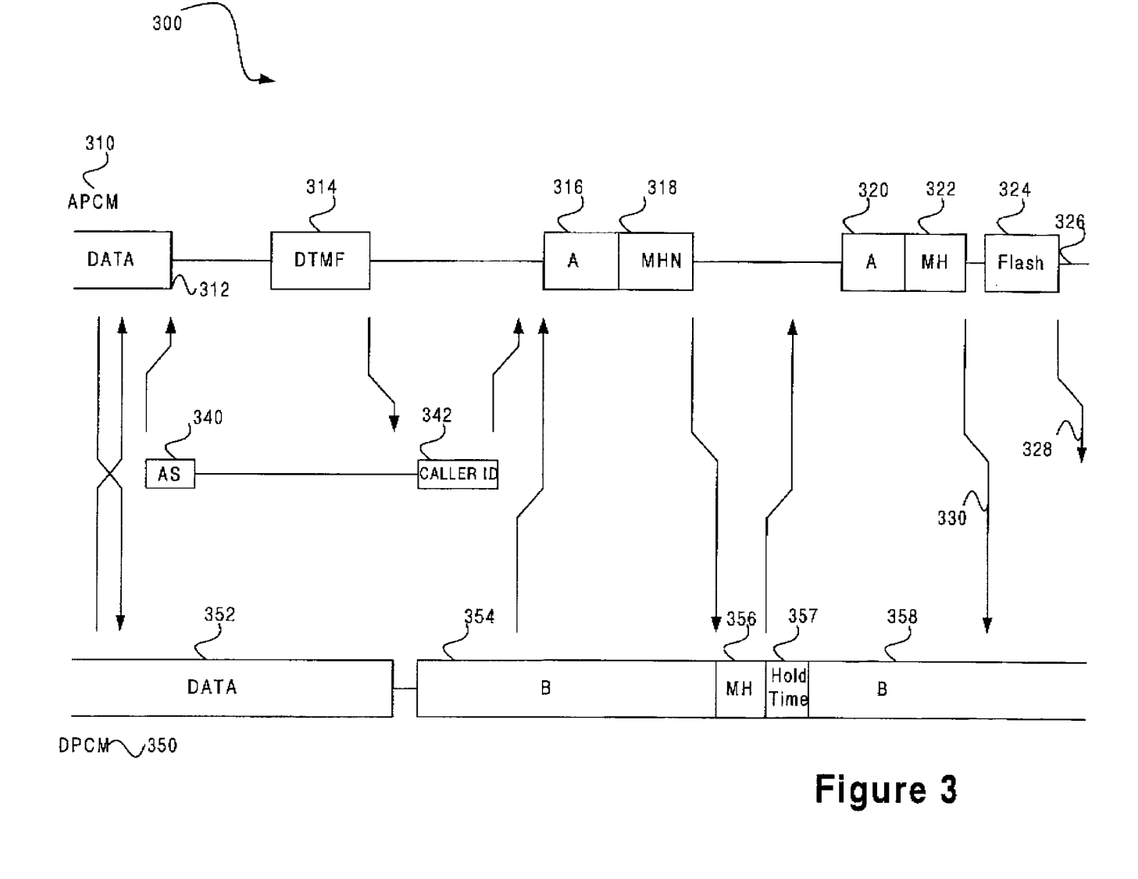
FIG. 3 is a timing diagram for placing a remote modem on hold in a modem-on-hold transaction.

FIG. 3 illustrates a timing diagram of a connection, between an APCM modem 310 and a DPCM modem 350, that is interrupted by a call-waiting indication and where the modem connection is placed on hold while the incoming call is answered by the APCM modem 310 end. FIG. 3 is applicable regardless of whether customer site 270 employs parallel answer device 210 or series answer device 211. The progression of signals, sequences, tones, commands, and the like are shown with respect to the APCM modem 310, the DPCM modem 350, and a central office (not shown). The central office may be associated with signals to the APCM modem 310 and signals to the DPCM modem 350.

During the data mode, the central office temporarily interrupts the modem connection and sends an alert signal ("AS") 340 to the APCM modem 310. The alert signal 340 may be a conventional call-waiting alert and it may include a component that is audible to humans (e.g., an audio tone) and a component that is detectable by data communication devices or machines. In accordance with most call-waiting protocols, the alert signal 340 components are transmitted in series. In response to the alert signal 340, the APCM modem 310 may send a DTMF tone 314 to request caller ID data from the central office. As described above, the DTMF tone 314 may be a short burst of a DTMF "D" tone having a duration of about 55–65 milliseconds. Assuming that the central office receives and recognizes the DTMF tone 314, the central office will format and transmit the caller ID data 342 to the APCM modem 310. As shown in FIG. 2a, the caller ID data 342 (represented by reference number 278 in FIG. 2a) may be received and processed in a suitable manner for display or analysis by a caller ID component 256.

In response to the switching out of the APCM modem 310 by the central office, the DPCM modem 350 starts transmitting an appropriate signal, e.g., a "B" tone 354. In one embodiment, the "B" tone 354 may be transmitted while the caller ID data 342 is being transmitted by the central office. The "B" tone 354 is continuously transmitted while the DPCM modem 350 waits for the APCM modem 310 to reply with an "A" tone 316.

During the period in which the central office interrupts the communication between the APCM modem 310 and the DPCM modem 350 by sending the alert signal 340 and the caller ID data 342 to the APCM modem 310, the DPCM modem starts receiving a silence. At this point, the APCM modem transmits a modem hold notification 318 to the DPCM modem 350. As shown, the modem hold notification 318 is preceded by a period of the "A"tone 316 transmission to the DPCM modem 350. The APCM modem 310 may transmit the "A"tone 316 if it receives the "B"tone 354 from the DPCM modem 318. As mentioned above, the "A"tone 316 is preferably transmitted for at least a minimum duration, e.g., 50 milliseconds, to give the DPCM modem 350 an opportunity to receive the "A"tone 350. If the DPCM modem 350 does not receive the "A" tone 316 within a specific time period, then it may eventually disconnect itself.

Once the DPCM modem 350 receives the modem hold notification 318 from the APCM modem 310, the DPCM modem 350 transmits a modem hold 356 to the APCM modem 310, informing the APCM modem 310 that the DPCM modem 350 is willing to be placed on hold while the APCM modem 310 switched to the incoming call. In some embodiments, the modem hold 322 may include a hold-time parameter 357 indicating the amount of time the DPCM modem 350 may be placed on hold before disconnecting. In other embodiments, the hold period may be negotiated at the initial training or any other time after a communication session has been established between APCM modem 310 and DPCM modem 350.

Assuming that the user of the APCM modem 310 desires to answer the incoming call, then a modem hold 322 is transmitted following an "A" tone 320. The modem hold 322 may be prompted automatically by a suitable device resident at the customer site 270 or it may be prompted in response to a user command. The modem hold 322, which may be formatted as described above, is preferably transmitted for at least a minimum period of time. In one embodiment, the modem hold 322 is transmitted for approximately 53 milliseconds (all of the modem status signals described herein may have a similar minimum duration). In one embodiment, in response to the modem hold 322, the DPCM modem 350 may transmit a modem hold acknowledgment (not shown) for a minimum period of time, e.g., approximately 53 milliseconds.

After the DPCM modem 350 transmits the modem hold 356 (or, alternatively, the hold-time parameter 357 or the modem hold acknowledgment (not shown)), the DPCM modem 350 preferably continues to transmit a "B" tone 358 while maintaining a hold state. In response to the modem hold acknowledgment (not shown) or after a predetermined period of time, the APCM modem 310 may generate a suitable flash signal 324 to instruct the central office to switch out the modem connection and to switch in the incoming call. Turning back to FIG. 2a, the APCM modem 204 may be configured to route the incoming signal to parallel answer device 210 or serial answer device 211 in an appropriate manner. In addition, the APCM modem 204 may be placed in an idle or "on-hook" state while the handset is connected. In some embodiments, the handset may remain off-hook (DAA low-impedance path, see FIG. 2b) or be placed in a caller ID state (DAA high-impedance path, see FIG. 2b).

In one embodiment, upon entering the modem-on-hold state, the APCM modem 204 transmits a status indication, including the hold-time period to the DTE 294. Turning to FIG. 2b, based on that indication, the DTE 294 displays a countdown box showing a number of minutes and/or seconds that the DPCM modem 202 has allowed the communication session be placed on hold, as indicated by the hold-time parameter 357. In other embodiments, the APCM modem 204 may generate a sound, such as a tone or speech that is audible on the communication devices 287 and 289 to indicate that the modem-on-hold session has begun, or to report the progress or termination of the modem-on-hold session, as discussed below in more details in conjunction with FIG. 6. For example, to generate a sound, the microprocessor 288 may toggle the off-hook/on-hook relay to generate a clicking sound. Yet, the microprocessor 288 may instruct the data pump 282 to generate a single tone at 1100 Hz for a period of time or an on-off-on 1100 Hz tones. Further, the microprocessor 288 may instruct the codec 283 to generate a digitized (or synthesized) audio sample, such as "on-hold," " on-hold for sixty seconds"or " you may begin now," "two minutes left," etc. As stated above, the DAA may be either in an off-hook state or in a caller ID state while the codec 283 is generating the digitized (or synthesized) audio sample. In some embodiments, the APCM modem may generate a sound that is not audible by a human user, but is detectable by the communication devices 287 and 289 or another device in communication with the DAA 284.

Turning back to FIG. 3, it should further be noted that the signaling routines and procedures described above, in connection with FIG. 3, may be equivalently applied to accommodate various requests that originate at the customer site 270 (see FIG. 2a). For example, in FIG. 3, the user of the APCM modem 310 may desire to place a current modem connection on hold, to prompt a quick reconnect, or to prompt a full retrain in an independent manner. In one embodiment, the modem hold notification ("MHN") and the modem hold ("MH") signals may be incorporated into the conventional Phase 4 constellation parameter ("CP") and modulation parameter ("MP") sequences. Accordingly, if either modem device desires to place the other modem device on hold (e.g., for three-way calling), then the requesting modem device may perform a rate renegotiation and transmit the hold signal in an appropriate manner. This technique may be performed in a similar manner as the conventional V.34, V.90 and V.92 clear down procedure, where a special code (data rate=0) is used to indicate a clear down. However, the modem hold signaling technique may utilize a different bit combination or leverage a number of reserved bits. Accordingly, in such embodiments, the interruption (e.g., control signals, data, or tones) of the communication channel may be by one of the communication device and not from the central office. Furthermore, the interruption may occur during a negotiation phase between the communication devices or after the communication devices have entered the data phase.

In response to the APCM modem's 310 user request to place the connection on hold, the APCM modem 310 may generate an "A" tone followed by an appropriate modem status signal (e.g., a modem hold notification, a modem hold, a quick reconnect request, or the like) for receipt by the DPCM modem 350. As described above in connection with FIG. 3, the DPCM modem 350 may then respond with a "B" tone followed by an appropriate status signal reply (e.g., a modem hold, a QTS signal, or the like). In this manner, these techniques can be applied in any number of situations unrelated to a call-waiting alert, a line interruption, or a line corrupting event.

Figure 4:
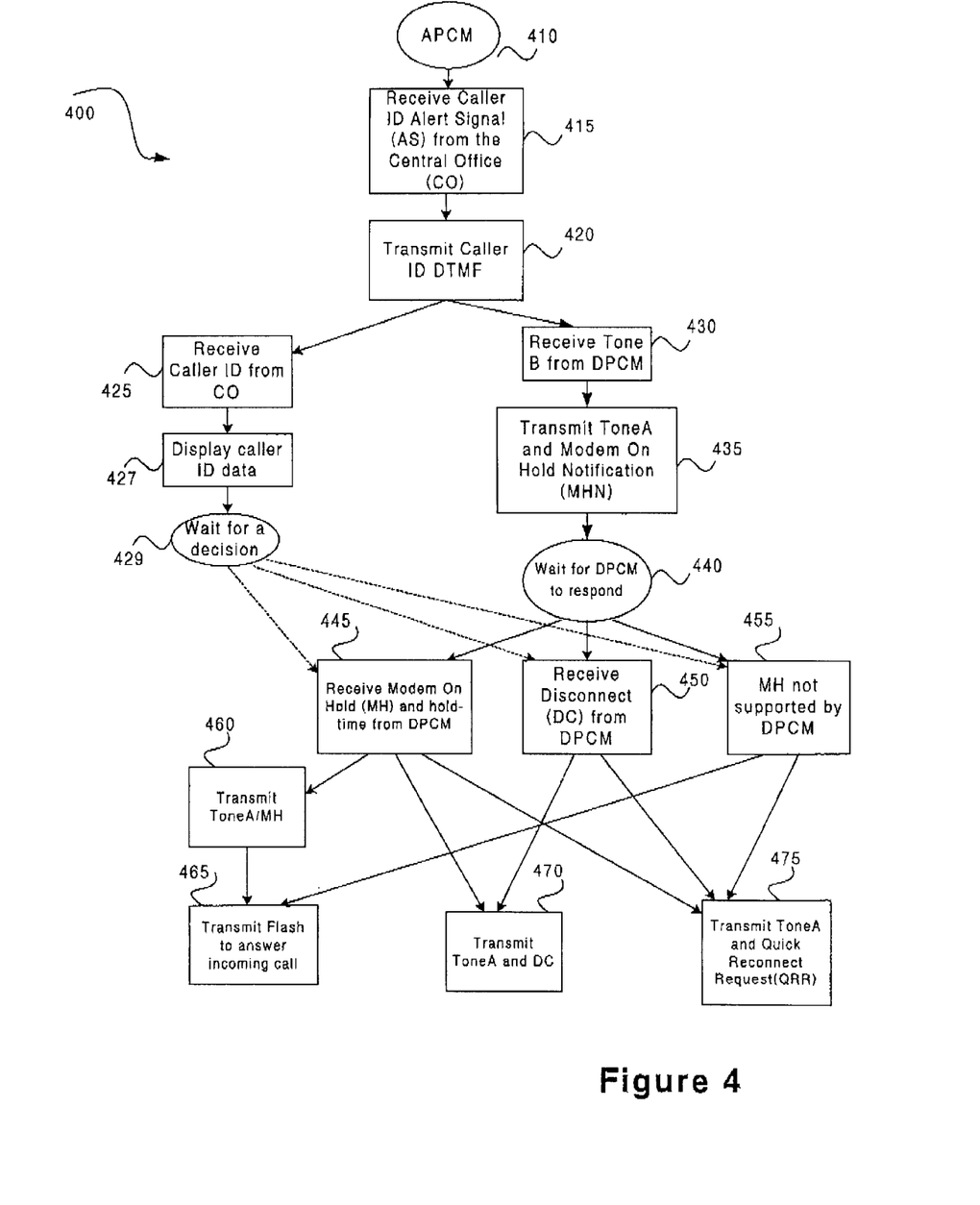
FIG. 4 is a flow diagram illustrating a modem-on-hold transaction.

Turning to FIG. 4, it illustrates an example flow diagram of the steps a client modem, e.g.,.an APCM modem, may take in response to receiving caller ID data from the central office while in communication with a DPCM modem. As shown in a communication on hold process 400, the ADPCM modem is continuously monitoring the line for an alert signal from the central office at step 410. Once the alert signal is detected, the process 400 transitions to alert signal step 415 where the alert signal is confirmed. After confirming the alert signal, the APCM modem moves to a DTMF step 420. At step 420, the APCM modem transmits a "D" tone, as explained above, to the central office requesting that the caller ID data be transmitted to the APCM modem. At this point, the APCM modem configures itself to receive the caller ID data. For example, the APCM modem receiver may be configured for V.21 operation for receiving the caller ID data. The APCM modem may further be configured to detect a "B" tone from the DPCM modem.

As shown in FIG. 4, after transmitting the "D" tone in step 420, the process 400 may start a multi-task operation where the process 400 concurrently monitors the line for both the caller ID data and the "B" tone from the DPCM modem in steps 425 and 430, respectively. Once the "B" tone is received, the process 400 transitions to step 430 out, where the "B" tone may be confirmed for a predetermined amount time, e.g., 10–20 milliseconds. At this point, the process 400 transitions to step 435 where the APCM modem transmits an "A" tone followed by a modem hold notification, as described above, to the DPCM modem. As a result of the multi-task operation of the process 400, in some embodiments, the transmission of the modem hold notification of step 435 may precede or overlap with the receipt of the caller ID data in step 425.

Now, the process 400 transitions to a wait state 440 where the APCM modem awaits a response from the DPCM modem. In the mean time, however, the APCM modem may be receiving the caller ID data from the central office. In one embodiment, the caller ID data, once received, may be formatted and displayed for use by a user at step 427. Back to the wait state 440, the DPCM modem may respond to the APCM modem notification in two ways or may not respond at all if modem on hold feature is not supported by the DPCM modem, as shown in steps 445, 450 and 455, respectively. The DPCM modem may respond with a modem on hold ("MH") indication and a communication hold-time, as shown in step 445, in which case, the process 400 may move to one of three steps 460, 470 or 475. The communication hold-time indicates the amount of time the DPCM modem is willing to be placed on-hold before terminating the communication session. In one embodiment, the hold-time may be transmitted at the time of initial training or any other time after the initial training. In some embodiments, the hold-time may be set by the APCM modem. In other embodiments, the hold-time may be derived from a combination of tones or a data frame, during the modem-on-hold process 400. Next, the decision as to which step is selected may be made automatically by the APCM modem based on a predetermined setting. For example, the APCM modem or the host software may check the caller ID data against stored information. Yet, the decision may be made by the user at step 429 in response to the caller ID data displayed at step 427. In the first option, the process 400 may move to state 460 where the APCM modem requests the DPCM modem to hold. Next, the process 400 transitions to flash step 465 where a flash signal is used to cease the incoming call while the DPCM modem is placed on hold. In one embodiment, the step 460 may be skipped and the process 400 may move directly from the step 445 to the flash step 465. In another embodiment, the APCM modem may wait for a modem on hold acknowledgement after the step 460 and before moving to the flash state 465.

In the second option, however, the process 400 may transition to disconnect state 470 after receiving an MH indication from the DPCM modem. Similar to the first option, the second option may be determined automatically or by the user. As shown, at the disconnect step, the process 400 transmits an "A" tone followed by a disconnect request ("DC") to the DPCM modem to terminate the communication session. As the third option, the process 400 may transition to a quick reconnect state 475, where the APCM modem ignores the incoming call and requests that the two modems reinstate their interrupted communication via a quick connect scheme described in the above-incorporated related applications. In some embodiments, the modems may retrain in a conventional manner.

Turning to the wait state 440, the DPCM modem may respond to the APCM modem notification with a disconnect ("DC") indication as shown in step 450. The receipt of DC by the APCM modem indicates that the DPCM modem would disconnect if the APCM modem wishes to answer the incoming call. At this step 450, the APCM modem has two options available, which options are shown in states 470 and 475. As stated above, the decision may be made automatically or by the user. At step 450, the user may also be informed of the DPCM modem's preference to disconnect, so the user may make a more informed decision. If a decision is made to answer the incoming call, the process 400 moves to state 470 to terminate the communication session, as described above. Alternatively, the process 400 may transition to the quick reconnect state 475 if a decision is made to ignore the incoming call and reinstate the connection.

As stated above, the DPCM modem may not respond to the APCM modem's modem on hold notification transmitted at step 435. In such case, the wait state 440 will eventually time out and the process 400 enters step 455. At step 455, the process 400 may inform the user of the status and request a response or may automatically decide whether to move to the flash state 465 or the quick reconnect state 475. If the flash state 465 is selected, the APCM modem ceases the incoming call and the DPCM modem will probably disconnect after a time out period. On the other hand, if the quick reconnect state 475 is entered, the APCM modem ignores the incoming call and the modems attempt to reconnect.

Figure 5:
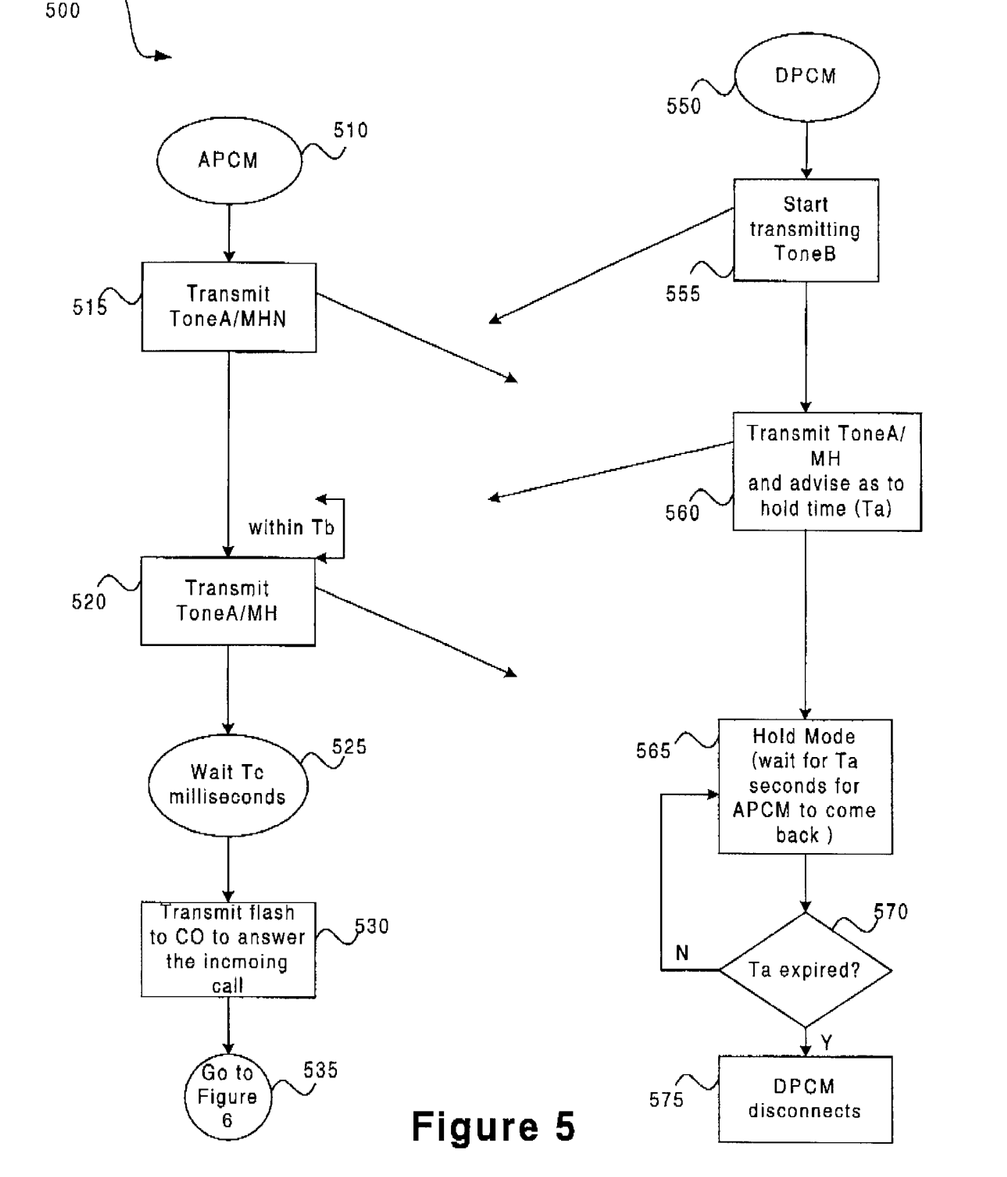
FIG. 5 is a flow diagram illustrating a modem-on-hold transaction resulting in placing a remote modem on hold.

FIG. 5 illustrates a flow diagram 500 of a modem on hold transaction resulting in placing the communication session on hold by the APCM modem. As shown, after an interruption in the communication session, DPCM process transitions from an initial state 550 to state 555 where the DPCM process starts transmitting a "B" tone to the APCM modem. At the other end of the connection, an APCM process is in its initial state 510 when it receives the "B" tone and in response transitions to state 515 where the APCM process transmits an "A" tone followed by a modem on hold notification. At the other end, at state 560, the DPCM process transmits an "A" tone followed by a modem hold signal advising the APCM modem that the DPCM may be placed on hold. As shown, the modem hold signal may include a "Ta" parameter indicating the amount of time the DPCM modem may be placed on hold. After receiving the "A" tone and the modem hold signal, the APCM process must move to state 520 within "Tb" time, e.g., 50–100 milliseconds, or otherwise the DPCM modem may terminate the modem on hold process. At state 520, the APCM process requests that the DPCM process to transition to the hold state 565. At this point, the DPCM process enters the hold state 565 and starts a timer for "Ta" period, e.g., 180 seconds. If Ta timer expires, the DPCM process terminates the communication session. At the other end, the APCM process waits for "Tc" time, 100–150 milliseconds, before transmitting a flash signal to the central office to cease the incoming call in state 530. The purpose of the "Tc" time delay is to assure that DPCM process has entered the hold state 565.

Figure 6:
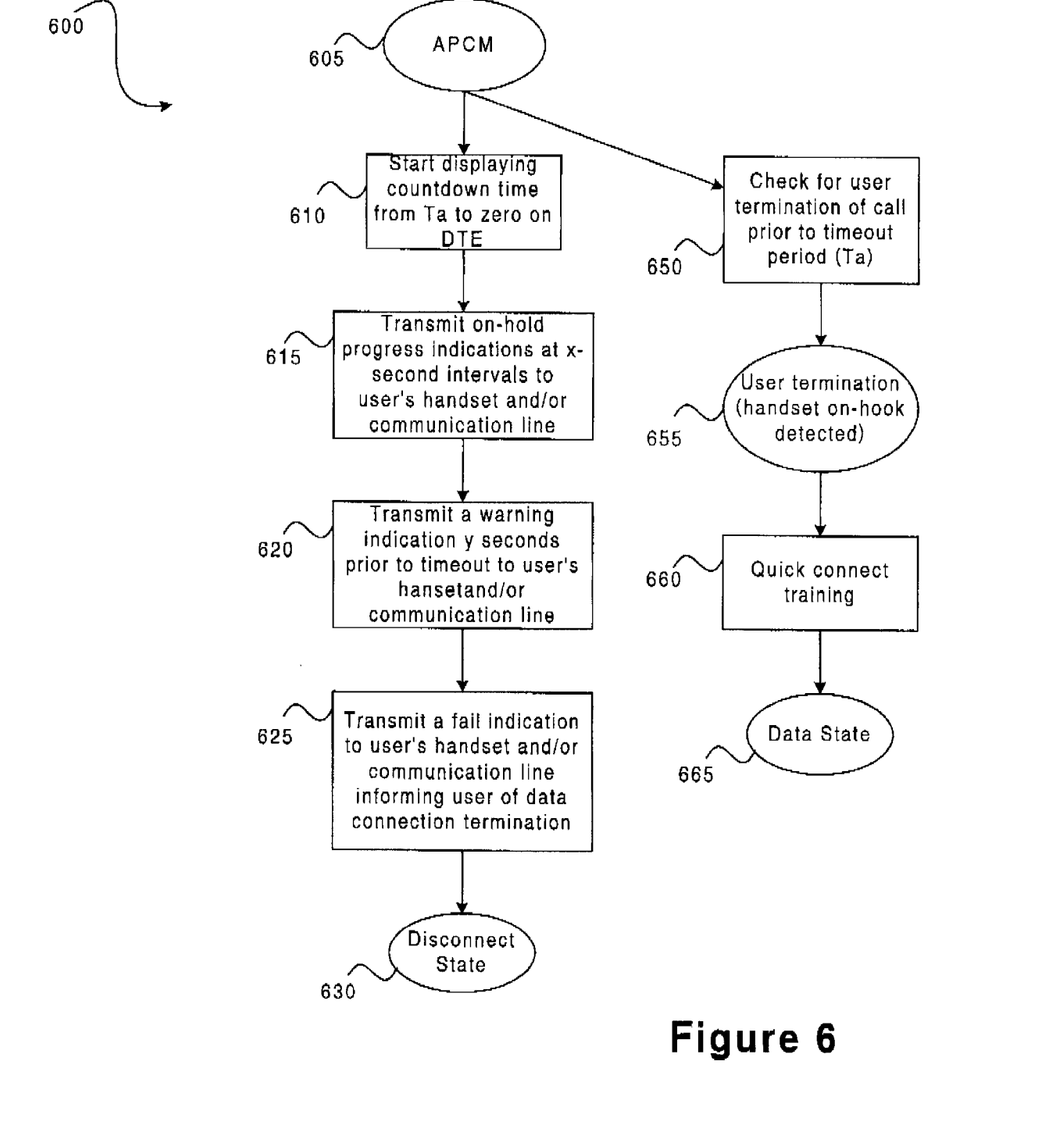
FIG. 6 is a flow diagram illustrating a notification process.

Upon ceasing the incoming call, in state 530, the APCM process moves to state 535 or the entry state 605 of the notification process 600 in FIG. 6. To keep the user informed of the time remaining prior to expiration of the communication on hold time-out and termination of the communication on hold, the notification process 600 requests that the DTE 294 display the countdown period starting from Ta, e.g. three minutes, down to zero in state 610. Next, in state 615, the notification process may generate an audible sound to inform the user via the communication devices 287 and 289 that the previous communication session has been placed on hold and that a new communication session has been established. As stated above, the audible sound may be a clicking sound generated by toggling the off-hook/on-hook relay. In one embodiment, the audible sound may be a single tone at 1100 Hz that is generated by the data pump 282 for about 100 ms. In yet another embodiment, the audible sound may be a digitized (or synthesized) audio sample generated by the codec 283 stating, for example, "on-hold", "on-hold for three minutes", or "time-out in thirty seconds."

In one embodiment, if the DAA 284 is placed in the on-hook state by the microprocessor 288 when the communication-on-hold state is entered, the DAA 284 will then be configured to the off-hook state or the caller ID state by the microprocessor 288 for the duration of transmitting either the single tone or the digitized (or synthesized) audio sample. In yet another embodiment, the tone or the digitized (or synthesized) audio sample may be generated such that it is not audible to a remote user.

As shown in state 615, in one embodiment, the audible sound may be generated at certain intervals, for example, every 60 seconds while the previous communication session remains on-hold. In other words, the state 615 generates an audible sound at 3 minutes, 2 minutes and 1 minute intervals before the expiration of the hold-time time-out period. For example, through various means, such as those described previously, digital data is provided to the codec 283, which may generate a digitized (or synthesized) audio sample announcing "one minute left," one minute prior expiration of the hold-time time-out period. The data pump may also generate progress tones to inform the user of the time remaining, e.g. by a "number" of beeps. For example, the single tone at 1100 Hz may be produced for 100 ms on, 100 ms off and 100 ms on, (i.e., generating two beeps) to inform the user that two minutes are remaining.

Next, the notification process 600 may enter a warning state 620 to warn the user that the communication on hold-time period is about to expire. The warning state 620 may generate any audible sound. In one embodiment, 30 seconds prior to expiration of hold-time period, the data pump 282 may generate a single tone at 2100 Hz. The tone may be generated with various on-to-off periods, e.g. 100 ms on, 100 ms off, 100 ms on, 100 ms off, 100 ms on, such that the user can hear three consecutive warning tones or beeps. Yet, the codec 283 may announce "thirty seconds left."

If the user does not remove the hold, i.e. return to the previous communication session, within the hold-time period, in state 625, the APCM modem may generate an audible sound informing the user that the original communication session has been terminated. In one embodiment, the data pump 282 may generate a fail tone or a single tone at 2750 Hz or a single tone with various on-to-off periods. Yet, the data pump 282 may generate a number of tones, for example, 100 ms of 100 Hz, 100 ms of off-time, 100 ms of 2100 Hz, 100 ms of off-time and 100 ms of 1000 Hz. The codec 283 may also announce "call-on-hold terminated." Next, in state 630, the notification process 600 moves to a disconnect state to terminate the communication on hold.

However, as shown in FIG. 6 and state 650, the notification process 600 concurrently monitors the status of the new communication session for the duration of the hold-time period, e.g. three minutes. If at any time during the hold-time period the new communication session is terminated, the notification process 600 moves to state 655. In one embodiment, the microprocessor 288 is capable of detecting, through the DAA 284, that the user has placed the modem communication device 287 on-hook and, thus, has terminated the new communication session. In that event, the notification process 600 moves to state 660 and may initiate a quick reconnect process to re-establish the previous communication session that has been placed on hold. If the reconnect process is successful, the notification process enters the data state 665.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. A communication method for use by a first modem during a communication session with a second modem, said first modem having a user, said communication method comprising the steps of:
    detecting an interruption n said communication session;
    requesting said second modem to place said communication session in an on-hold state in response to said interruption;
    receiving a hold response from said second modem in response to said requesting step, said hold response including a hold time;
    placing said communication session in said on late in response to said step of receiving said hold response; and
    generating a plurality of indications based on said hold time to provide a status of said on-hold state to said user of said fist modem during said on-hold state;
    wherein said communication session is terminated by said second modem upon expiration of said hold time unless, prior to said expiration of said hold time and in response to said plurality of indications, said user requests said first modem to terminate said on-hold state or terminate said communication session.

2. The communication method of claim 1 further comprising a step of terminating said on-hold state in response to said status.

3. The communication method of claim 2 further comprising a step of re-establishing said communication session.

4. The communication method of claim 3, wherein said re-establishing step uses a modem quick connect process.

5. The communication method of claim 1, wherein said plurality of indications are data including said status, and wherein said method further comprises a step of displaying said status on a display device in communication with said first modem.

6. The communication method of claim 1, wherein said plurality of indications use a sound.

7. The communication method of claims 6, wherein said first modem generates said sound to provide a notification of a remaining time of said hold time.

8. The communication method of claim 6, wherein said first modem generates said sound to notify a start of said on-hold state.

9. The communication method of claim 6, wherein said first modem generates said sound to notify a progress of said on-hold state.

10. The communication method of claim 9, wherein said sound is generated more than once at a pre-determined time interval.

11. The communication method of claims 6, wherein said first modem generates said sound to provide a warning of nearing an expiration time of said hold time.

12. The communication method of claim 6, wherein said first modem generates said sound to notify an expiration time of said hold time.

13. The communication method of claim 9,further comprising a step of terminating said communication session.

14. The communication method of claim 6, wherein said sound is a tone.

15. The communication method of claim 6, wherein said sound is an audio sound.

16. The communication method of claim 15, wherein said audio sound is generated by a codec in said first modem.

17. The communication method of claim 6, wherein said sound is a digitized sound rendered through a DAC in said first modem.

18. The communication method of claim 6, wherein said sound is a synthesized sound rendered through a DAC in said first modem.

19. The communication method of claim 6, wherein said sound is generated by toggling a relay in said first modem.

20. A modem comprising:
a controller;
a data pump controlled by said controller; and
a data access arrangement controlled by said controller;
wherein said controller establishes a communication, session with a remote modem using said data pump and said data access arrangement,
wherein said controller transmit a request to said remote modem to place said communication session in an on-hold state in response to an interruption in said communication session,
wherein said controller receives a hold response from said remote modem in response to said request, said hold-response including a hold time,
wherein said controller places said communication session in said on-hold state in response to said hold response, and said controller generates a plurality of indications based on said hold time to provide a status of said on-hold state to a user of said modem during said on-hold state, and
wherein said communication session is terminated by said remote modem upon expiration of said hold time unless, prior to said expiration of said hold time and in response to said plurality of indications, said,user requests said modem to terminate said on-hold-state or terminate said communication session.

21. The modem of claim 20, wherein said plurality of indications uses a sound.

22. The modem of claim 21, wherein said controller generates said sound by toggling a relay in said data access arrangement.

23. The modem of claim 21, wherein said controller generates said sound by transmitting a tone.

24. The modem of claim 23, wherein said controller uses said data pump to generate said tone.

25. The modem of claim 21, further comprises a codec, wherein said controller uses said codec to generate said sound.

26. The modem of claim 21, wherein said sound is generated to provide a progress notification relating to said hold time.

27. The modem of claim 21, wherein said sound is generated to provide a warning notification relating to said hold time.

28. The modem of claim 21, wherein said tone is generated to provide an expiration notification of said hold time.

29. The modem of claim 20, wherein said plurality of indications are data including said status for display on a display device.

30. The modem of claim 29, wherein said status is an expiration time, and wherein said display device displays a countdown of said expiration time.

31. A computer program product for use by a first modem during a communication session with a second modem, said first modem having a user, said computer program product comprising:
code for detecting an interruption in said communication session;
code for requesting said second modem to place said communication session in an on-hold state in response to said interruption;
code for receiving a hold response from said second modem in response to said requesting, said hold response including a hold time;
code for placing said communication session in said on-hold state in response to said receiving said hold response; and
code for generating a plurality of indications based on said hold time to provide a status of said on-hold state to said user of said first modem during said on-hold state;
wherein said communication session is terminated by said second modem upon expiration of said hold time unless, prior to said expiration of said hold time and in response to said plurality of indications, said user requests said first modem to terminate said on-hold state or terminate said communication session.

32. The computer program product of claim 31, further comprising code for terminating said on-hold state in response to said status.

33. The computer program product of claim 32, further comprising code for re-establishing said communication session.

34. The computer program product of claim 33, wherein said re-establishing step uses a modem quick:connect process.

35. The computer program product of claim 31, wherein said plurality of indications are data including said status, and wherein said computer program product further comprises code for displaying said status on a display device in communication with said first modem.

36. The computer program product of claim 31, wherein said plurality of indications use a sound.

37. The computer program product of claim 36, wherein said first modem generates said sound to provide a notification of a remaining time of said hold timed.

38. The computer program product of claim 36, wherein said first modem generates said sound to notify a start of said on-hold state.

39. The computer program product of claim 36, wherein said first modem generates said sound to notify a progress of said on-hold state.

40. The computer program product of claim 39, wherein said sound is generated more than once at a pre-determined time interval.

41. The computer program product of claim 36, wherein said first modem generates said sound to provide a warning of nearing an expiration time of said hold time.

42. The computer program product of claim 36, wherein said first modem generates said sound to notify an expiration time of said hold time.

43. The computer program product of claim 42, further comprising code for terminating said communication session.

44. The computer program product of claim 36, wherein said sound is a tone.

45. The computer program product of claim 36, wherein said sound is an audio sound.

46. The computer program product of claim 45, wherein said audio sound is generated by a codec in said first modem.

47. The computer program product of claim 36, wherein said sound is a digitized sound rendered through a DAC in said first modem.

48. The computer program product of claim 36, wherein said sound is a synthesized sound rendered through a DAC in said first modem.

49. The computer program product of claim 36, wherein said sound is generated by toggling relay in said first modem.

* * * * *

UNITED STATES PATENT AND TRADEMARK OFFICE
CERTIFICATE OF CORRECTION

PATENT NO. : 6,690,776 B1
DATED : February 10, 2004
INVENTOR(S) : Charles F. Raasch It is certified that error appears in the above-identified patent and that said Letters Patent is hereby corrected as shown below:

Column 16,
Line 6, reading "detecting an interruption n said communication session;" should read
-- detecting an interruption in said communication session; --.
Line 13, reading "placing said communication session in said on late in" should read
-- placing said communication session in said on-hold state in --.

Column 17,
Line 10, reading "wherein said controller establishes a communication," should read
-- wherin said controller establishes a communication --.
Line 28, reading "response to said plurality of indications, said,user" should read
-- response to said plurality of indications, said user --.

Column 18,
Lines 22-23, reading "said re-establishing step uses a modem quick:connect process" should read -- said re-establishing step uses a modem quick connect process --.
Lines 32-33, reading "said first modem generates said sound to provide a notification of a remaining time of said hold timed" should read -- said first modem generates said sound to provide a notification of a remaining time of said hold time --.

Signed and Sealed this

Thirteenth Day of April, 2004

JON W. DUDAS
*Acting Director of the United States Patent and Trademark Office*